Jan. 31, 1956 W. G. PRION 2,732,926
ROTATABLE JIGS
Filed Oct. 22, 1952 2 Sheets-Sheet 1

INVENTOR.
William G. Prion
BY William B. Jaspert
Attorney.

United States Patent Office 2,732,926
Patented Jan. 31, 1956

2,732,926
ROTATABLE JIGS
William G. Prion, Carnegie, Pa.
Application October 22, 1952, Serial No. 316,114
4 Claims. (Cl. 198—33)

This invention relates to new and useful improvements in apparatus for soldering caps on the ends of tubular bodies such as buster tubes, and it is among the objects thereof to provide apparatus in which the tubes are charged and provided with the end caps and solder rings which are fluidized to solder the cap on the tube while the tube is revolved and passing a fire zone.

The invention will become more apparent from a consideration of the accompanying drawing, constituting a part hereof, in which like reference characters designate like parts, and in which.

Figures 1, 3, 4:
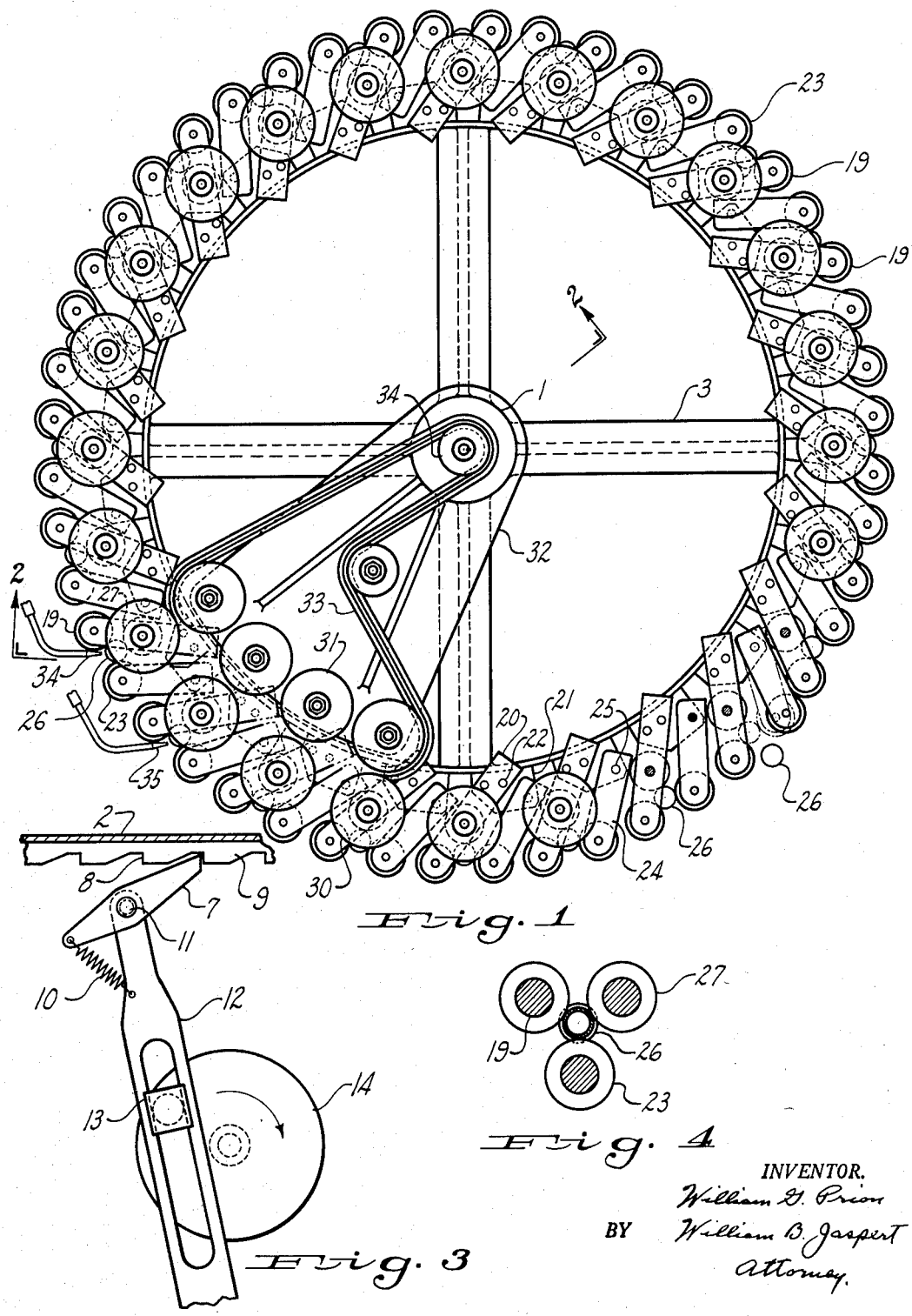
Fig. 1 is a top plan view of a machine embodying the principles of this invention.
Fig. 3 is a side elevational view of an enlarged detail of the driving pawl for rotating the machine, taken along the line 3—3, Fig. 2.
Fig. 4 is a cross section taken along the line 4—4 of Fig. 2.
Figure 2:
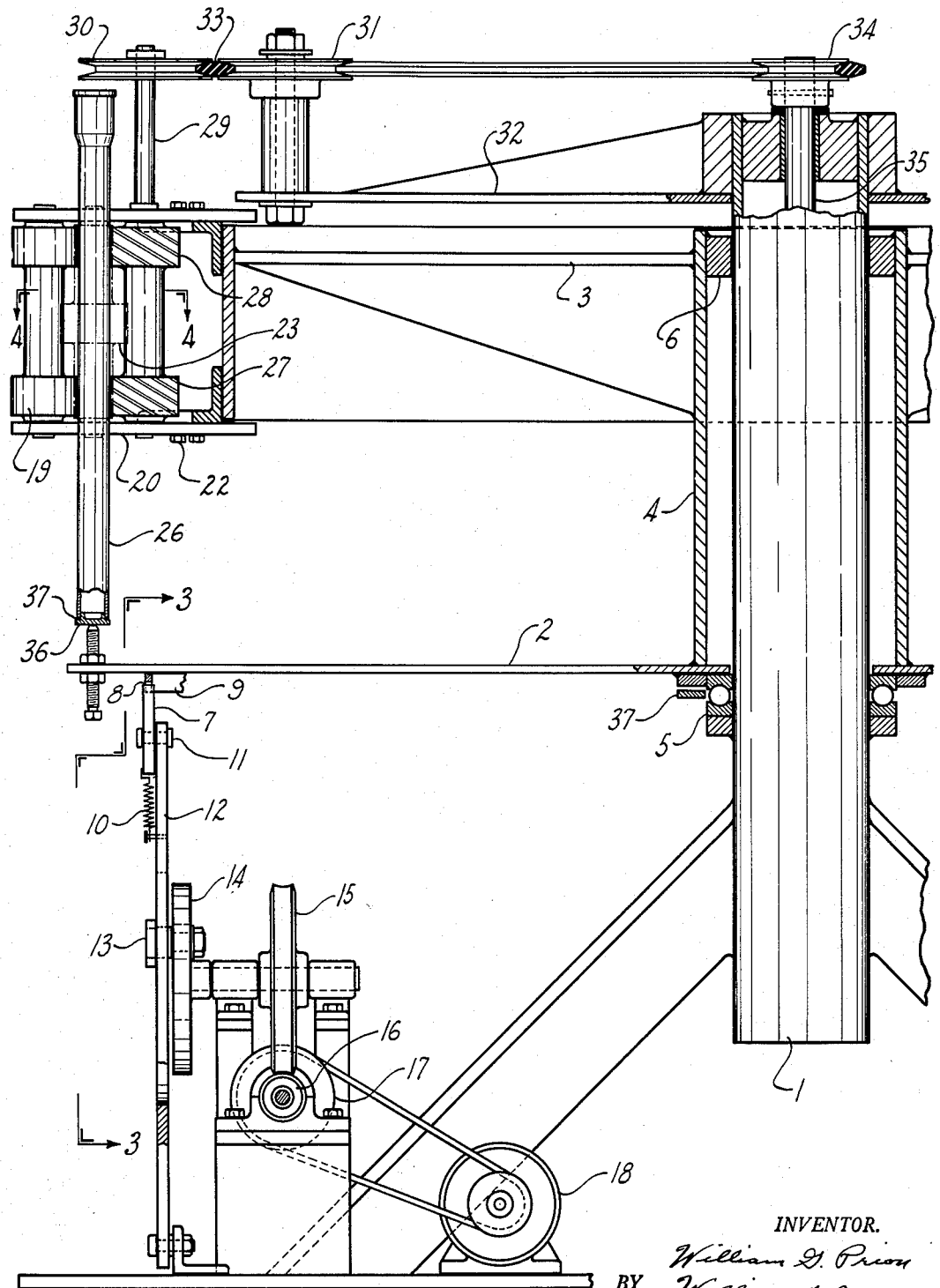
Fig. 2 is a vertical cross-sectional view partially in elevation taken along the line 2—2, Fig. 1.

With reference to the several figures of the drawing, the numeral 1 designates a spindle on which is mounted a plate 2 and radial arms 3, the members 2 and 3 being connected by a sleeve 4 that rests upon a ball bearing 5 on spindle 1 and which is provided with a journal bearing 6 at the top thereof. Spindle 1 is stationary and the plate 2 is rotated by means of a pawl 7, Fig. 3, that engages the notches 8, Fig. 3, provided in a ring 9 that is welded to the plate 2 as shown in Fig. 2. The pawl 7 is provided with a spring 10 that normally biases the pawl in an upward direction but which permits it to slip over the teeth between successive notches. The pawl 7 is pivotally mounted at 11 on a pitman 12 that is pivotally held on a pinion 13 carried by a disc 14 that is rotated by a worm wheel 15 driven by a worm 16 through a gear reduction 17 that is driven by a motor 18. The table 2 may be termed a rotating jig for supporting a plurality of spools designated by the numeral 19. These spools are mounted on fingers 20 secured to brackets 21 by screw bolts 22, Figs. 1 and 2, to hold the spools 19 in a fixed radial position.

Cooperating with the fixed spools 19 are a plurality of rollers 23 mounted on fingers 24 that are pivotally mounted at 25 on the brackets 21. The fingers 24 are biased by springs, not shown, to urge rollers 23 in the direction of the spools 19 to provide a gripping action for engaging the tubular member 26 to be soldered.

As shown in Fig. 2, each of the fingers 20 carry two spools, one of which, designated by the numeral 27, is provided with helical knobs or projections 28 which produce pressure on the tube 26 in an axial direction downwardly when the tube is revolved. The spool 27 is provided with an extension shaft 29 having a sheave wheel 30 mounted thereon. The sheave wheels are in alignment with sheave wheel 31 that are carried by a spider 32 extending from the spindle 1, there being four sheave wheels 31 carried by the spider 32 as shown in Fig. 1. Sheave wheels 31 are driven by a double V-belt 33 which engages a drive wheel 34 of a shaft 35 driven by a motor, not shown, independently of the drive shown at the bottom of Fig. 2. The sheave wheels 30 and 31 are spaced so that the double V-belt 33 passes therebetween and drives the sheave wheels 30 of the spool shafts 29 when they pass along the spaced sheave wheels 31 as shown in Fig. 1. This causes the spools to revolve and in turn rotate the tubes 26 while they pass over a plurality of burner flames supplied by burners 34 and 35, Fig. 1. The tubes 26 are assembled with the end caps 36 and a ring of solder 37 disposed therebetween. As the tubes revolve and pass over the burners 34 and 35 the solder melts and the cap 36 is soldered to the end of the tube 26. As shown in Fig. 1, the tubes may be inserted at a point remote from the burners 35 and may be retained on the revolving jig for a sufficient length of time to cool them for handling when the end caps are soldered thereon. Undesired movement of table 2 caused by the double V-belt 33 engaging the sheave wheels 30 may be prevented by the use of a brake shoe 37, Fig. 2.

It is evident from the foregoing description of this invention that rotating jigs for soldering end caps or tubes made in accordance therewith provide for an expedient and uniform soldering of the end caps, exposing the portion to be soldered to uniform temperatures and with a minimum of handling.

Although one embodiment of the invention has been herein illustrated and described, it will be evident to those skilled in the art that various modifications may be made in the details of construction without departing from the principles herein set forth.

I claim:

1. In a rotating jig for soldering tubes, rotary table having a plurality of angularly spaced fixed brackets and a plurality of cooperating hinged brackets, pairs of spool shaped rollers on each of said fixed brackets and a roller on said hinged bracket in alignment with the space between the cylindrical surfaces of said spool rollers for holding tubular members against and between the rollers of said fixed brackets, one of said spool-shaped rollers of each pair having means for engaging the tubular members to urge the same in an axially downward direction in response to rotation, and means for rotating said last-named spool roller during a portion of the travel of the rotary table.

2. In a rotating jig for soldering tubes, rotary table having a plurality of angularly spaced fixed brackets and a plurality of cooperating hinged brackets, pairs of spool shaped rollers on each of said fixed brackets and a roller on said hinged bracket in alignment with the space between the cylindrical surfaces of said spool rollers for holding tubular members against and between the rollers of said fixed brackets, one of said spool-shaped rollers of each pair having means for engaging the tubular members to urge the same in an axially downward direction in response to rotation, and means for rotating said last-named spool roller during a portion of the travel of the rotary table, said rotary table having a pawl and ratchet drive for subjecting the table to rotary movement independently of the rotating means of said rollers.

3. In a rotating jig for soldering tubes, a rotary table having a plurality of angularly spaced fixed brackets and a plurality of cooperating hinged brackets, pairs of spool shaped rollers on each of said fixed brackets and a roller on said hinged bracket in alignment with the space between the cylindrical surfaces of said spool rollers for holding tubular members against and between the rollers of said fixed brackets, one of said spool shaped rollers of each pair having means for engaging the tubular members to urge the same in an axially downward direction in response to rotation, said last-named spool roller having a sheave wheel for rotating the same, and means in the path of movement of the sheave wheels for effecting engagement of the wheel with a movable belt to rotate the roller for a portion of the travel of the rotary table.

4. In a rotating jig for soldering tubes, a rotary table having a plurality of angularly spaced fixed brackets and a plurality of cooperating hinged brackets, pairs of spool shaped rollers on each of said fixed brackets and a roller on said hinged bracket in alignment with the space between the cylindrical surfaces of said spool rollers for holding tubular members against and between the rollers of said fixed brackets, one of said spool shaped rollers of each pair having means for engaging the tubular members to urge the same in an axially downward direction in response to rotation, said last-named spool roller having a sheave wheel for rotating the same, a plurality of driven spindles having sheave wheels with their V faces in juxtaposed relation to the sheave wheels of said rollers and spaced therefrom the thickness of a double V-belt, said driven spindle sheave wheels constituting guides for an endless V-belt, a drive sheave wheel and an endless double V-belt connecting said drive and driven sheave wheels, whereby the sheave wheels of said rollers are driven by said belt while passing adjacent said driven spindle sheave wheels.

References Cited in the file of this patent

UNITED STATES PATENTS

| | | |
|---|---|---|
| 1,743,755 | Casella et al. | Jan. 14, 1930 |
| 2,528,860 | Clark | Nov. 7, 1950 |
| 2,577,594 | Taylor | Dec. 4, 1951 |